(12) United States Patent
Hansson

(10) Patent No.: US 6,323,775 B1
(45) Date of Patent: Nov. 27, 2001

(54) METHOD, SYSTEM AND APPARATUS FOR PROXIMITY-BASED RECHARGE NOTIFICATION

(75) Inventor: Hans Magnus Hansson, Malmö (SE)

(73) Assignee: Telefonaktiebolaget IM Ericsson (publ) (SE)

( * ) Notice: Subject to any disclaimer, the term of this patent is extended or adjusted under 35 U.S.C. 154(b) by 0 days.

(21) Appl. No.: 09/370,448

(22) Filed: Aug. 10, 1999

(51) Int. Cl.⁷ .................................................. G08B 21/00
(52) U.S. Cl. ........................ 340/636; 235/384; 320/48; 701/22
(58) Field of Search ........................ 340/636, 988, 340/995, 457.4; 901/1; 235/384; 701/22, 213; 414/227; 320/2, 48, 112, 107

(56) References Cited

U.S. PATENT DOCUMENTS

| | | | |
|---|---|---|---|
| 4,229,688 | * 10/1980 | Knox et al. | 320/48 |
| 4,679,152 | * 7/1987 | Perdue | 180/167 |
| 5,045,769 | * 9/1991 | Everett, Jr. | 320/2 |
| 5,047,961 | 9/1991 | Simonsen | 364/550 |
| 5,049,802 | * 9/1991 | Mintus et al. | 320/2 |
| 5,431,264 | * 7/1995 | Tseng et al. | 191/10 |
| 5,499,181 | * 3/1996 | Smith | 340/457.4 |
| 5,539,399 | * 7/1996 | Takahira et al. | 340/995 |
| 5,600,566 | 2/1997 | Park | 364/481 |
| 5,696,437 | 12/1997 | Panther et al. | 320/43 |
| 5,726,636 | 3/1998 | Hayes, Jr. | 340/636 |
| 5,732,347 | 3/1998 | Bartle et al. | 455/421 |
| 5,790,976 | * 8/1998 | Boll et al. | 701/209 |
| 5,815,824 | * 9/1998 | Saga et al. | 701/22 |
| 6,014,011 | * 1/2000 | DeFelice et al. | 320/114 |

FOREIGN PATENT DOCUMENTS

| | | |
|---|---|---|
| 05344056 | 12/1993 | (JP) . |
| 08079339 | 3/1996 | (JP) . |
| 08079834 | 3/1996 | (JP) . |
| 10022903 | 1/1998 | (JP) . |
| 11185188 | 7/1999 | (JP) . |

OTHER PUBLICATIONS

J. Haartsen, "Bluetooth—The Universal Radio Interface for Ad Hoc, Wireless Connectivity", Ericsson Review No. 3, 1998, pp. 110–117.

Standard Search Report for RS 103688US Completed Mar. 10, 2000.

* cited by examiner

Primary Examiner—Brent A. Swarthout
(74) Attorney, Agent, or Firm—Jenkens & Gilchrist (57) ABSTRACT

An apparatus, system and method notifies a user of a low battery condition when the remaining battery capacity of a portable electronic device, such as a mobile station, pager, portable computer, video camera, or personal digital assistant, falls below a predetermined level and the portable electronic device is proximally located to a corresponding charging unit. The proximity of the portable electronic device to the charging unit may be detected by using geographic positioning, such as the GPS, the GLONASS or the GSM location-determining algorithms, or by monitoring a short range radio interface, such as Bluetooth or Home RF.

34 Claims, 5 Drawing Sheets

METHOD, SYSTEM AND APPARATUS FOR PROXIMITY-BASED RECHARGE NOTIFICATION

BACKGROUND OF THE INVENTION

1. Technical Field of the Invention

The present invention relates in general to the field of portable battery-operated electronic devices, and in particular, by way of example but not limitation, to battery monitoring and proximity-based recharge notification for portable battery-operated electronic devices.

2. Description of Related Art

Portable battery-operated electronic devices have become an increasingly important part of our modern technological society. No longer are these devices considered a luxury, available only to the rich and affluent. Rather, as people become more mobile through their jobs, recreational activities and lifestyle choices, they have become increasingly reliant upon the convenience and services that portable electronic devices offer. Moreover, with the advances in semiconductor technology and integrated circuit miniaturization, portable electronic devices have become smaller, lighter and increasingly more sophisticated. These aspects of portable electronic devices have enabled users to fully exploit technological advances in a manner and under circumstances that would be impossible using conventional stationary systems. When these portable electronic devices incorporate communication capabilities, such as cellular radio, the portable electronic device becomes even more advantageous. Many users, in fact, rely upon their portable electronic device as their sole means of communication while they are traveling or visiting customers. Many users also appreciate the enhanced security provided by the ability to contact family, friends or emergency services from remote locations. With these advantages, it is no wonder that portable electronic devices have experienced an almost exponential increase in demand and have become critical to the lives and livelihood of many individuals.

One of the problems experienced with portable electronic devices, however, is that these small hand-held devices are powered by small, rechargeable batteries that normally provide a limited number of hours of active service. Once the batteries are discharged below a certain level, the portable electronic device will cease to function. The battery or batteries will then need to be recharged before the user may utilize the functions and services of the portable electronic device. Because the battery may take an hour or more to recharge using conventional charging systems, this downtime could be extremely inconvenient and especially problematic during an emergency. Moreover, in many cases, the user may not discover the low battery condition until it would be extremely inconvenient or even impossible to recharge the battery, such as when the user needs to make an important communication, accomplish an important task, or when a charging unit is not readily available.

Existing approaches have attempted to alleviate these problems by warning the user of a low battery condition in time for the user to take appropriate action. These approaches utilize circuitry which continuously monitors the battery and notifies the user when the remaining battery capacity falls below a predetermined level. The methods employed to notify the user of the low battery condition may include acoustical indications, textual or graphical indications on the display or flashing LED's. After receiving this notification, the user then has the responsibility to place the battery in a charging unit before the battery is depleted.

The problem with this approach is that the user will typically receive the low battery notification while the user is located away from the charging unit (e.g., while the user is traveling or at a customer's location). By the time the user returns to the location of the charging unit(e.g., home or office), it is likely that the user has forgotten about the low battery notification received earlier. With existing approaches, it is likely that the user will not be reminded of the low battery condition until the user attempts to use the device. At this point, it may no longer be convenient or possible to connect the battery to the charging unit because either the user lacks the time or a charging unit is not readily available. As a result, the user is likely to be on the road with a depleted or nearly depleted battery. Therefore, there exists a need to notify the user of a low battery condition in a manner that increases the likelihood that the battery can and will be recharged.

SUMMARY OF THE INVENTION

The deficiencies of the prior art are overcome by the apparatus, system and method of the present invention. For example, as heretofore unrecognized, it would be beneficial to monitor the remaining battery capacity of a portable battery-powered electronic device and provide a recharge notification when the remaining battery capacity falls below a predetermined level and the electronic device is proximally located to a charging unit. In a first embodiment of the present invention, proximity of the electronic device to the charging unit is determined using geographical positioning. The present geographic location of the electronic device is determined using such methods as the Global Positioning System (GPS), the Global Navigation Satellite System (GLONASS), and Global System for Mobile communications (GSM) location-determining algorithms. This geographic location is then compared to a stored geographic location of a corresponding charging unit. When the battery capacity of the electronic device falls below a predetermined level and the electronic device's present geographic location is within a predetermined distance from the stored geographic location of the charging unit, a recharge notification is initiated.

In a second embodiment, proximity of the electronic device to the charging unit is determined by monitoring associated short range radio transceivers. If the remaining battery capacity of the electronic device is below a predetermined level and a short range radio transceiver associated with the electronic device detects a short range radio transceiver associated with the charging unit, a recharge notification is initiated informing the user that the battery needs to be recharged and that a charging unit is conveniently located nearby. In this instance, the limited transmission range of the associated short range radio transceivers indicates the proximity of the electronic device to the charging unit.

The technical advantages of the present invention include, but are not limited to the following. It should be understood that particular embodiments may not involve any, much less all, of the following exemplary technical advantages.

One important technical advantage of the present invention is that it decreases the likelihood that the user will be on the road with a depleted or nearly depleted battery by providing the user a recharge notification when the battery needs recharging and a charging unit is conveniently located nearby.

Another important technical advantage of the present invention is that it provides a more relevant recharge notification to the user by notifying the user of a low battery condition at a time when and at a location where the user may take immediate appropriate action. Yet still another important technical advantage of the present invention is that it eliminates the need for the user to remember a recharge notification received at a time when a charging unit is not readily available.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the apparatus, system and method of the present invention may be had by reference to the following detailed description when taken in conjunction with the accompanying drawings wherein.

DETAILED DESCRIPTION OF THE DRAWINGS

In the following description, for purposes of explanation and not limitation, specific details are set forth, such as particular circuits, software modules, techniques, etc. in order to provide a thorough understanding of the invention. However, it will be apparent to one of ordinary skill in the art that the present invention may be practiced in other embodiments that depart from these specific details. In other instances, detailed descriptions of well-known methods, devices, and software code are omitted so as not to obscure the description of the present invention with unnecessary detail.

Furthermore, it should be emphasized that although the following description describes certain aspects of the present invention in the context of a mobile station embodiment, the practice of the present invention is not limited to mobile stations. Rather, it will be apparent to one of ordinary skill in the art that the teachings of the present invention are equally applicable to portable battery-operated electronic devices in general, such as video cameras, portable computers, personal digital assistants (PDAS), and other battery-driven electronic products that are recharged by a charging unit, as well as to other portable radio communication devices such as pagers, communicators, so-called electronic organizers and the like. Therefore, the mobile station embodiment described herein is provided for the purpose of explanation, and not limitation.

Figure 1:
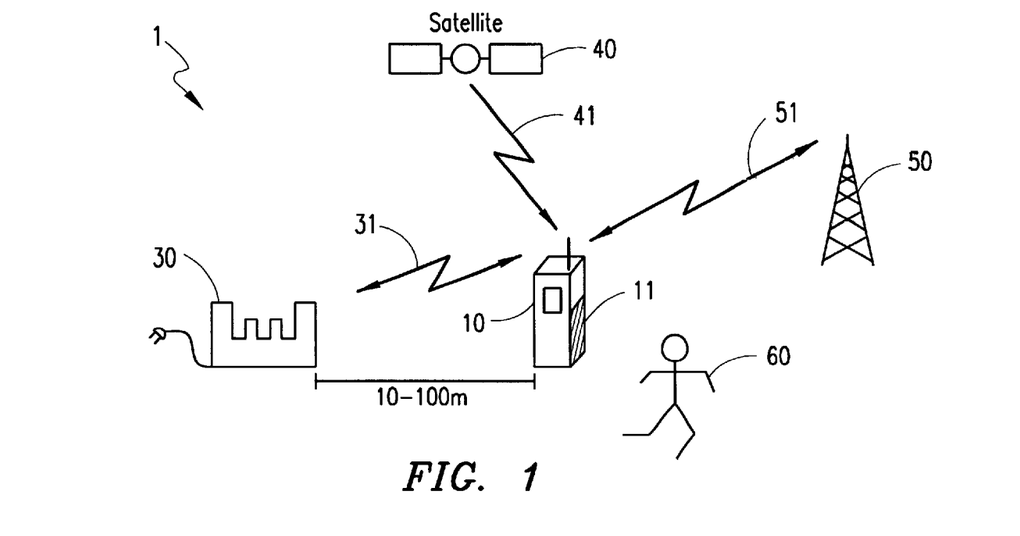
FIG. 1 illustrates a portion of an exemplary wireless system with which the present invention may be advantageously practiced.

A preferred embodiment of the present invention and its advantages are best understood by referring to FIGS. 1–6 of the drawings, like numerals being used for like and corresponding parts of the various drawings. Referring to FIG. 1, a portion of an exemplary wireless system with which the present invention may be advantageously practiced is depicted generally at 1. In this exemplary wireless system, a mobile station 10 is powered by a battery 11 which may be, for example, a nickel-cadmium battery, alkaline battery or other rechargeable battery commonly used to power portable cellular telephones, other telecommunication devices or portable battery-powered electronic devices in general. Base station 50 is a part of a cellular network (not shown) and enables the mobile station 10 to communicate with other mobile stations within the cellular network and with terminals connected to the Public Switched Telephone Network (PSTN). Of course, the mobile station 10 will not be able to communicate with the base station 50 and will cease to function if the battery 11 becomes depleted. The user 60 will then need to recharge the battery 11 before he or she may make additional phone calls or otherwise utilize the functions and services of the mobile station 10.

In accordance with certain aspects of the present invention, the mobile station 10 initiates a recharge notification to the user 60 when the remaining battery capacity of the battery 11 falls below a predetermined level and the mobile station 10 is proximally located to a charging unit 30. For example, the mobile station 10 may initiate a recharge notification when the remaining battery capacity of the battery 11 falls below 40 percent and the mobile station 10 is within 10 to 100 meters from the charging unit 30. In a first embodiment, the mobile station 10 determines its proximity to the charging unit 30 using geographic positioning, such as the Global Positioning System (GPS) or services provided by GSM and GLONASS. In a first example, the mobile station 10 may determine its present geographic location (e.g., longitude and latitude) by communicating with GPS satellites over air interface 41. GPS satellite 40 represents one of a "constellation" of 24 satellites in orbit at 10,600 miles above the earth and, when used in conjunction with additional GPS satellites, enables circuitry associated with the mobile station 10 to "triangulate" a geographic position on the ground with an accuracy ranging from 100 to 10 meters depending on the mode of the GPS receiver. The mobile station 10 may then compare its present geographic location to a stored geographic location of a corresponding charging unit 30. If the remaining battery capacity of the battery 11 is below a predetermined level and the present geographic location of the mobile station 10 is within a predetermined distance from the stored geographic location of the corresponding charging unit 30, a recharge notification is initiated informing the user 60 that the battery 11 needs to be recharged and that a charging unit is located nearby.

In a second embodiment, the proximity of the mobile station 10 to a corresponding charging unit 30 is determined by utilizing a short range radio interface, such as Bluetooth or Home RF. Short range radio transceivers associated with each device enable the mobile station 10 to determine its proximity to the charging unit 30 by enabling the mobile station 10 to determine whether the charging unit 30 is within its limited transmission range. For example, short range radio transceivers conforming to Bluetooth specifications have two (2) different classes of output RF power with a transmission range of 10 and 100 meters, respectively. When the mobile station 10 acts as a paging unit, the mobile station 10 may detect the presence of the charging unit 30 by monitoring identifications received in response to an inquiry signal sent by the mobile station 10 to all devices within transmission range. Alternatively, when the charging unit 30 acts as the paging unit, the charging unit 30 sends a paging signal to all devices within transmission range, and the mobile station 10 periodically monitors its associated short range transceiver. Upon receipt of a paging signal, the mobile station 10 may detect the presence of the changing unit 30 by monitoring identifications received in response to an acknowledgment signal sent by the mobile station 10. The mobile station 10 may then compare the received identifications to a list of stored identities associated with known charging units. Accordingly, if the remaining battery capacity of the battery 11 falls below a predetermined level and the mobile station 10 receives a identification corresponding to a known charging unit, a recharge notification is initiated. Optionally, the mobile station 10 only responds to a page from the charging unit 30 or transmits an inquiry signal to devices within transmission range if the remaining capacity of the battery 11 falls below a predetermined level.

Figure 2:
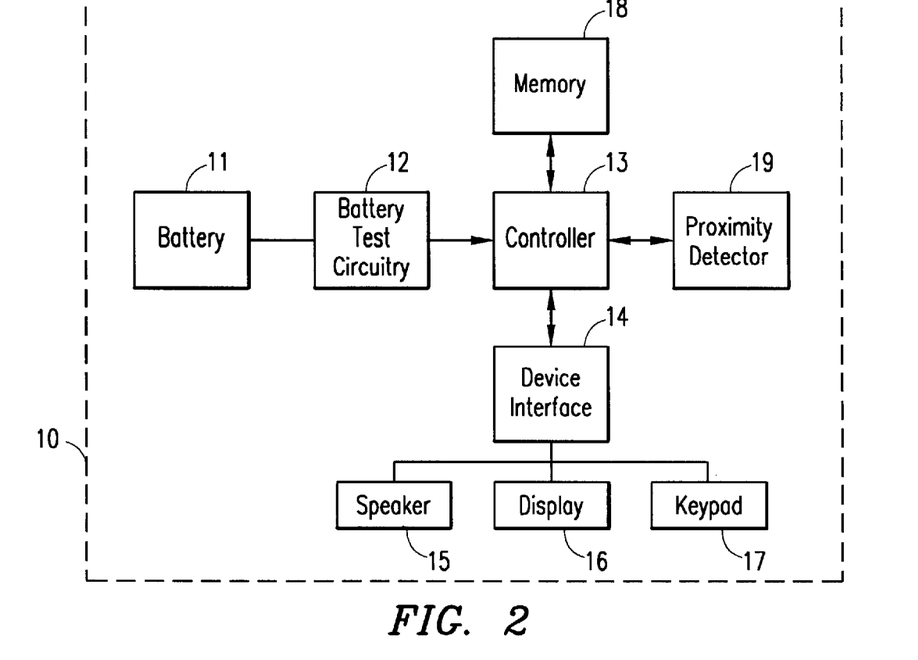
FIG. 2 illustrates an exemplary internal block diagram of a mobile station in accordance with the present invention.

Referring to FIG. 2, an exemplary internal block diagram of a mobile station 10 in accordance with the present invention is depicted. As illustrated, the battery 11 is connected to battery test circuitry 12 which is used to measure the remaining battery capacity of the battery 11. The battery test circuitry 12 may measure the remaining battery capacity of the battery 11 by, for example, monitoring the internal resistance, voltage level or current level, or any combination of these methods. It should be noted, however, that the novelty of the present invention does not depend on the type of battery test circuitry employed. Thus, the specific examples provided are given as illustration, and not as a limitation.

The output of the battery test circuitry 12 is connected to an input of a controller 13. The controller 13 monitors the output of the battery test circuitry 12 in order to detect when the remaining battery capacity of the battery 11 falls below a predetermined level (e.g., 40 percent). Alternatively, the battery test circuitry 12 may measure the remaining battery capacity of the battery 11 directly and send a signal to the controller 13 when the remaining battery capacity falls below a predetermined level. It should be noted that the predetermined level at which a low battery condition is detected may be preset by hardware or software modules. Alternatively, however, the predetermined level may be adjustably controlled by user input from a keypad 17 or automatically by the mobile station 10 after observing a user's usage patterns.

The controller 13 is also connected to a device interface 14 and memory 18. The device interface 14 is responsive to signals sent from the controller 13 and is used to control input/output devices such as a speaker 15, a display unit 16 and a keypad 17. By sending a signal to the device interface 14, the controller 13 is able to initiate a recharge notification through, for example, acoustical indications over the speaker 15 and/or visual indications over the display 16. The device interface 14 may also send signals to the controller 13 corresponding to user input from the keypad 17, such as the desired battery capacity level described above. Although the device interface 14 is illustrated as a separate device, the device interface 14 can be integrated within the controller 13 in order to conserve space, speed processing, etc. A memory 18 is also interfaced with the controller 13 and is used to store software instructions and data. The data that may be stored within the memory 18 will be discussed in further detail below with respect to the first and second embodiments.

The controller 13 is further connected to a proximity detector 19 which is used to determine the proximity of the mobile station 10 to a charging unit 30. The proximity detector 19 may determine the proximity of the mobile station 10 to the charging unit 30 by, for example, using geographic positioning, such as the Global Positioning System (GPS), GSM or GLONASS, using a short range radio interface, such as Bluetooth or Home RF, etc. When a low battery condition is detected, the controller 13 sends a signal which activates the proximity detector 19. When the proximity detector 19 determines that the mobile station 10 is proximally located to a charging unit 30 (e.g., within 10 to 100 meters), the proximity detector 19 sends a signal to the controller 13 so indicating the proximity. Alternatively, the controller 13 may receive data from the proximity detector 19 and use this data to determine the proximity of the mobile station 10 to the charging unit 30. It should be noted that all or portions of the proximity detector 19 may be integrated into the controller 13 in order to conserve space, speed processing, etc.

The distance at which the proximity detector 19 or the controller 13 detects the proximity of a charging unit 30 may be preset by the hardware implementation of the proximity detector 19. Preferably, however, the proximity detector 19 may be selectably configured by user input from the keypad 17 so that the user may select between at least two distances. This may be accomplished, for example, by switching between conventional and differential mode in the GPS or switching between the two classes of RF output power in a Bluetooth implementation.

Figure 2A:
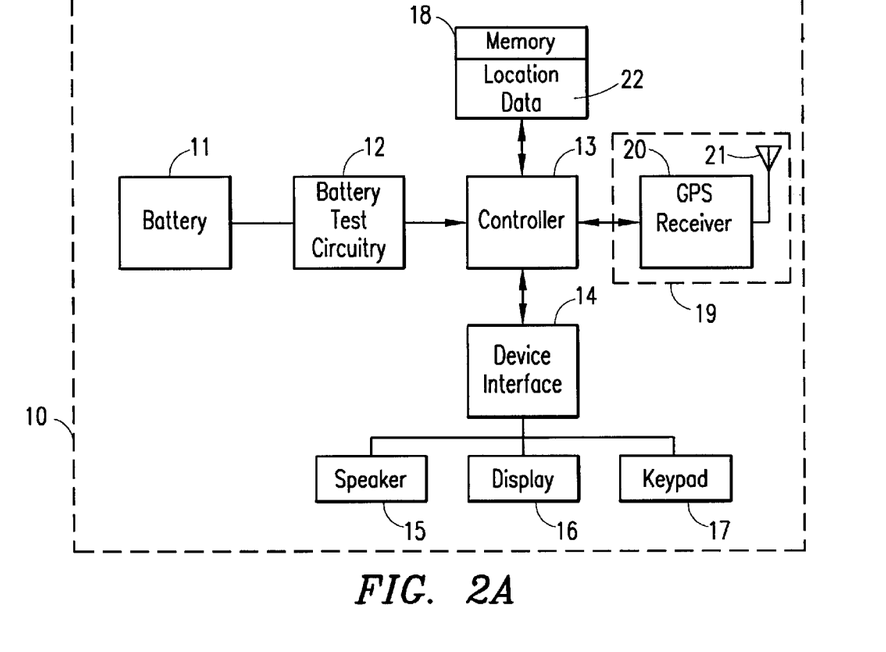
FIG. 2A illustrates an exemplary internal block diagram of a mobile station in accordance with a first embodiment of the present invention.

Referring to FIG. 2A, an exemplary internal block diagram of a mobile station in accordance with a first embodiment of the present invention is depicted. This embodiment determines the proximity of the mobile station 10 to a charging unit 30 using geographic positioning, in particular the GPS in one version of this first embodiment. As illustrated, the proximity detector 19 is composed of a GPS receiver 20 connected to an antenna 21. When activated by the controller 13 in response to a low battery condition, the GPS receiver 20 receives signals from GPS satellites via antenna 21. The GPS receiver 20 uses these signals to "triangulate" a present geographic location (e.g., longitude and latitude) of the mobile station 10. Data corresponding to this present geographic location is then transmitted by the GPS receiver 20 to the controller 13, which uses the data in the manner discussed below. However, it should be noted that although the GPS receiver 20 and the antenna 21 are illustrated within mobile station 10, these components may reside in an external module that is connected to the mobile station 10 via, for example, an electrical connector, an infrared (IR) link, etc.

FIG. 2A also shows location data 22 stored within the memory 18. The location data 22 represents a list of geographic locations (e.g., longitude and latitude) where there are corresponding charging units that may be used for charging the mobile station's battery 11. This list may be created or edited by allowing the user to enter location coordinates via the keypad 17 for places where corresponding charging units are located. A more user-friendly method, however, enables the user to go to where charging units are located and, by pressing a button on the keypad 17, to record that particular geographic location in the list. This user-friendly method utilizes the GPS receiver 20 and the antenna 21 discussed above. By comparing the present geographic location of the mobile station 10 to the stored geographic location of known charging units, the controller 13 may calculate the distance between the mobile station 10 and relevant charging units 30.

Figure 2B:
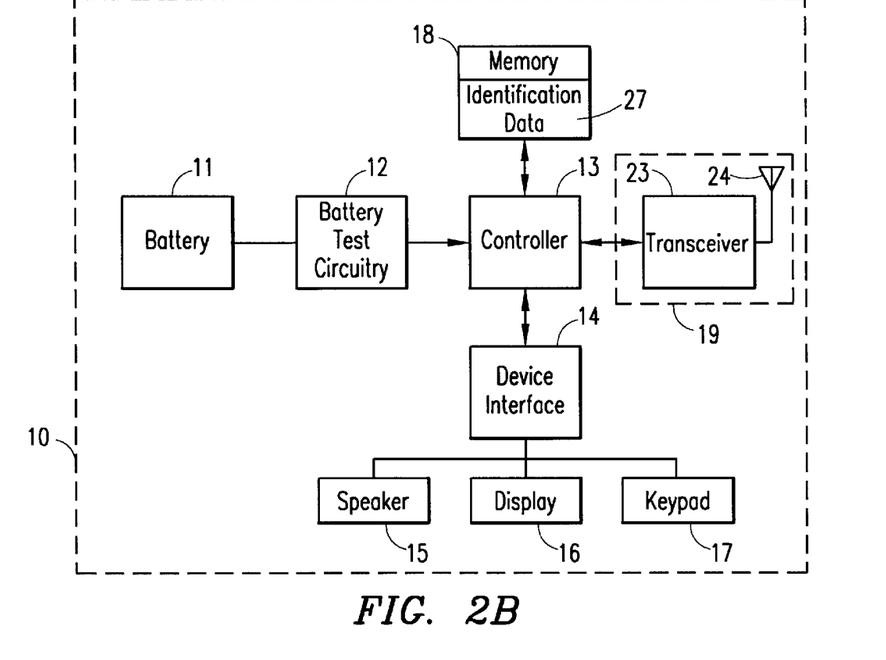
FIG. 2B illustrates an exemplary internal block diagram of a mobile station in accordance with a second embodiment of the present invention.
Figure 3:
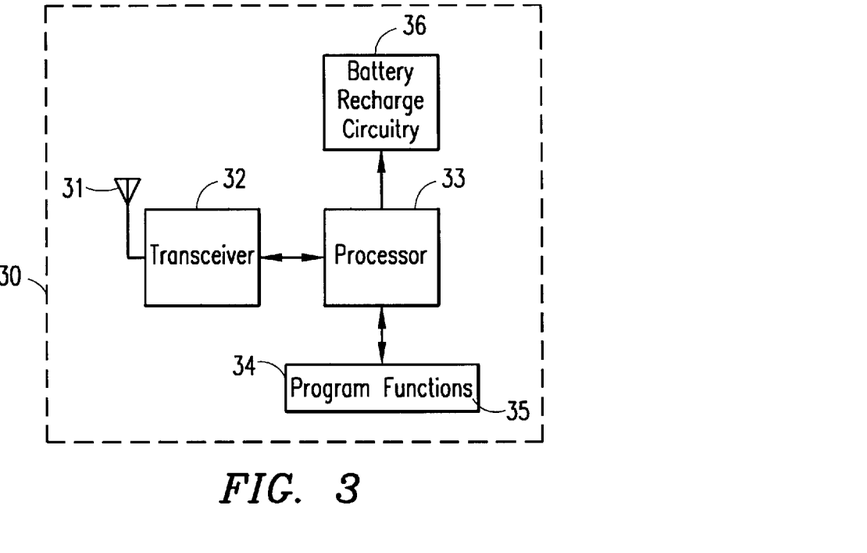
FIG. 3 illustrates an exemplary internal block diagram of a charging unit in accordance with the second embodiment of the present invention.

FIG. 2B depicts an exemplary internal block diagram of a mobile station in accordance with a second embodiment of the present invention. This second embodiment determines the proximity of the mobile station 10 to the charging unit 30 using a short range radio interface, in particular a short range radio interface implementing Bluetooth specifications in one version of this second embodiment. As illustrated, proximity detector 19 comprises a Bluetooth transceiver 23 connected to an antenna 24 which will be described in further detail below. Referring to FIG. 3, an exemplary internal block diagram of a charging unit in accordance with the second embodiment of the present invention is illustrated. As illustrated, charging unit 30 is also equipped with a similar type of Bluetooth transceiver 32 and antenna 31. A processor 33 is interfaced with the transceiver 32 and is also interfaced with battery recharge circuitry 36 for recharging batteries and a memory unit 34. The memory unit 34 contains program functions 35 for controlling the operation of the processor 33, such as activating or deactivating a recharge cycle.

Continuing now with FIG. 2B, in operation, when the controller 13 activates transceiver 23, in response to a low battery condition, the transceiver 23 periodically transmits a inquiry signal to all devices located within transmission range. Devices that receive the inquiry signal will respond by transmitting a unique Bluetooth identity associated with that device. In a preferred embodiment, however, in order to conserve the battery capacity of the mobile station 10, the transceiver 32 (of FIG. 3) associated with the charging unit 30 periodically transmits a paging signal, and when the controller activates the transceiver 23 associated with the mobile station 10, the transceiver 23 periodically or continuously listens for paging signals from devices located within transmission range. When the transceiver 23 receives a paging signal from such a device, the transceiver 23 will transmit an acknowledgment, and the device will respond by transmitting its unique Bluetooth identity. In both examples, the controller 13 may then retrieve the identities received by the transceiver 23 and compare them to a list of stored identities of known charging units as described below. However, it should be noted that although the transceivers 23 and 32 and the antennas 24 and 31 are illustrated within the mobile station 10 and the charging unit 30, respectively, these components may reside in external modules that are connected to the mobile station 10 and the charging unit 30 via, for example, an electrical connector, an IR link, etc. Furthermore, the transceiver 32 and the antenna 31 associated with the charging unit 30 may be located physically near the charging unit 30, such as within a piece of computer equipment.

FIG. 2B also shows identification data 27 stored within the memory 18. Identification data 27 represents a list of Bluetooth identity numbers corresponding to known charging units. This list may be created or edited by allowing the user to enter the identity numbers of known charging units via the keypad 17. A more user-friendly method, however, enables the user to go to where known charging units are located and by pressing a button on the keypad 17, to request that the transceiver 23 associated with the mobile station 10 communicate with the transceiver 32 associated with the charging unit 30. The controller 13 may then retrieve the identity associated with the charging unit 30 and store it in the list of identification data 27. By taking advantage of the limited transmission range of transceivers 23 and 32, the controller 13 may determine the proximity of the mobile station 10 to the charging unit 30 by comparing the identities received in response to a signal (e.g., paging signal, inquiry signal or acknowledgment signal) to the list of stored identities of known charging units.

Figure 4:
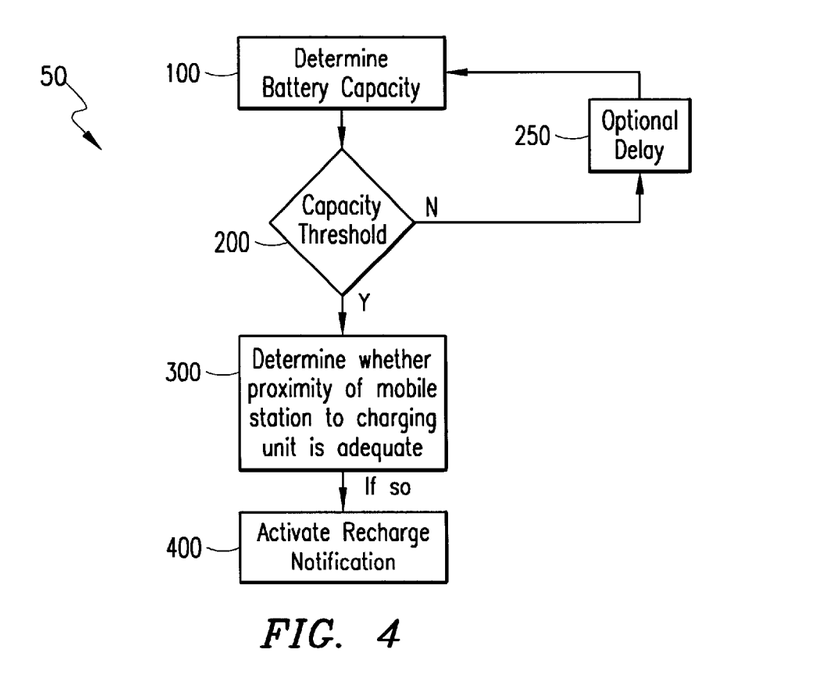
FIG. 4 illustrates an exemplary flow diagram of a method in accordance with the present invention.

Referring now to FIG. 4, an exemplary flow diagram of a method in accordance with the present invention is depicted generally at 50. At step 100, battery test circuitry 12 measures the remaining capacity of the battery 11. This remaining capacity is then compared with a predetermined threshold value (e.g., 40 percent) at step 200. If the remaining battery capacity is greater than the predetermined threshold, control passes back to step 100 where the remaining capacity of battery 11 is again determined. An optional delay period 250 may be interposed between step 200 and step 100. If the remaining capacity of the battery 11 is below the predetermined threshold at step 200, the proximity of the mobile station 10 to the charging unit 30 is determined at step 300 by activating the proximity detector 19. A recharge notification is activated at step 400 if the proximity is adequate.

Figure 5:
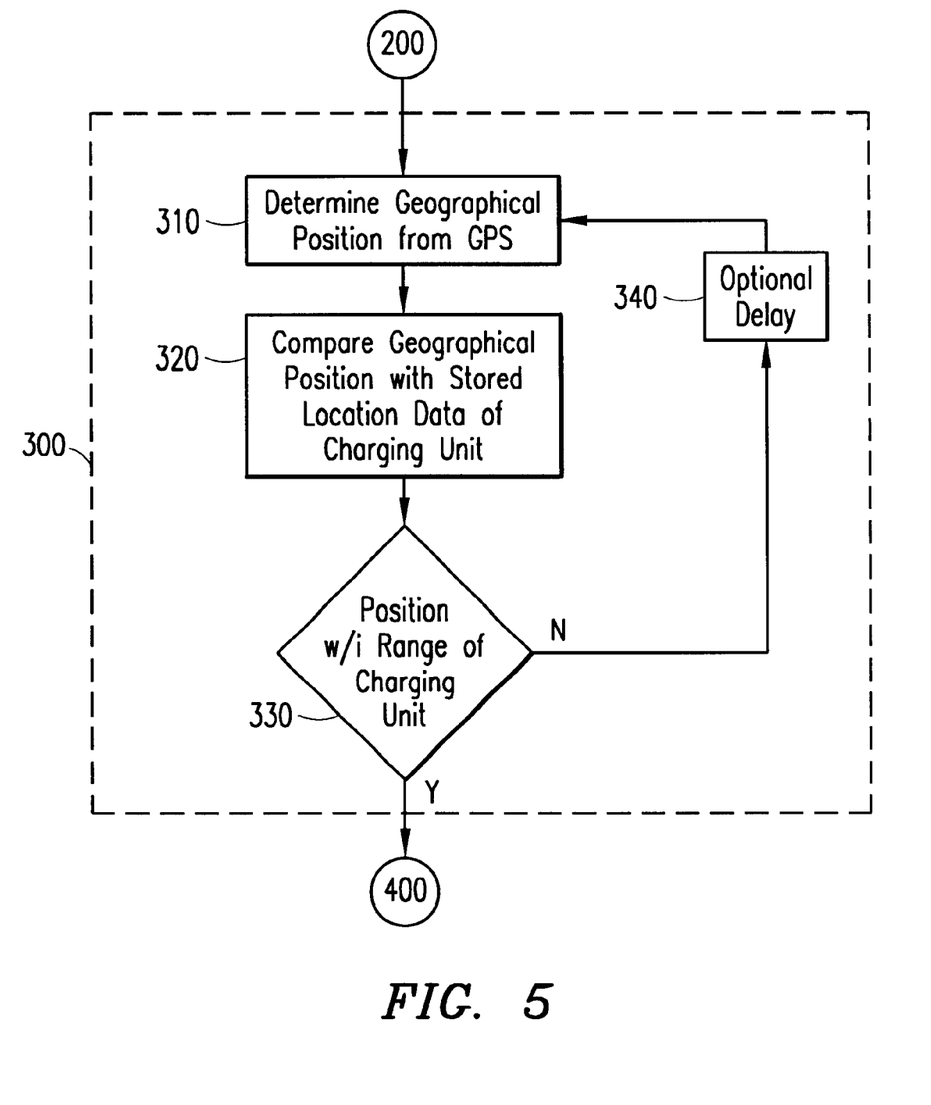
FIG. 5 illustrates an exemplary flow diagram of a method in accordance with the first embodiment of the present invention.

An exemplary flow diagram in accordance with the first embodiment of the present invention is illustrated in FIG. 5. After step 200, the geographic location of the mobile station 10 is determined from the GPS receiver 20 at step 310. The determined geographical location is then compared at step 320 with one or more geographical locations of known charging units stored in the memory 18. At step 330, if the distance between the mobile station 10 and the charging unit 30 is greater than a predetermined distance, control passes back to step 310 where the present geographical location of the mobile station 10 is updated. It should be noted that an optional delay step 340 may be interposed between step 330 and step 310 to conserve power. On the other hand, if the distance between the mobile station 10 and the charging unit 30 is within the predetermined distance at step 330, control passes to step 400 where a recharge notification is initiated.

Figure 6:
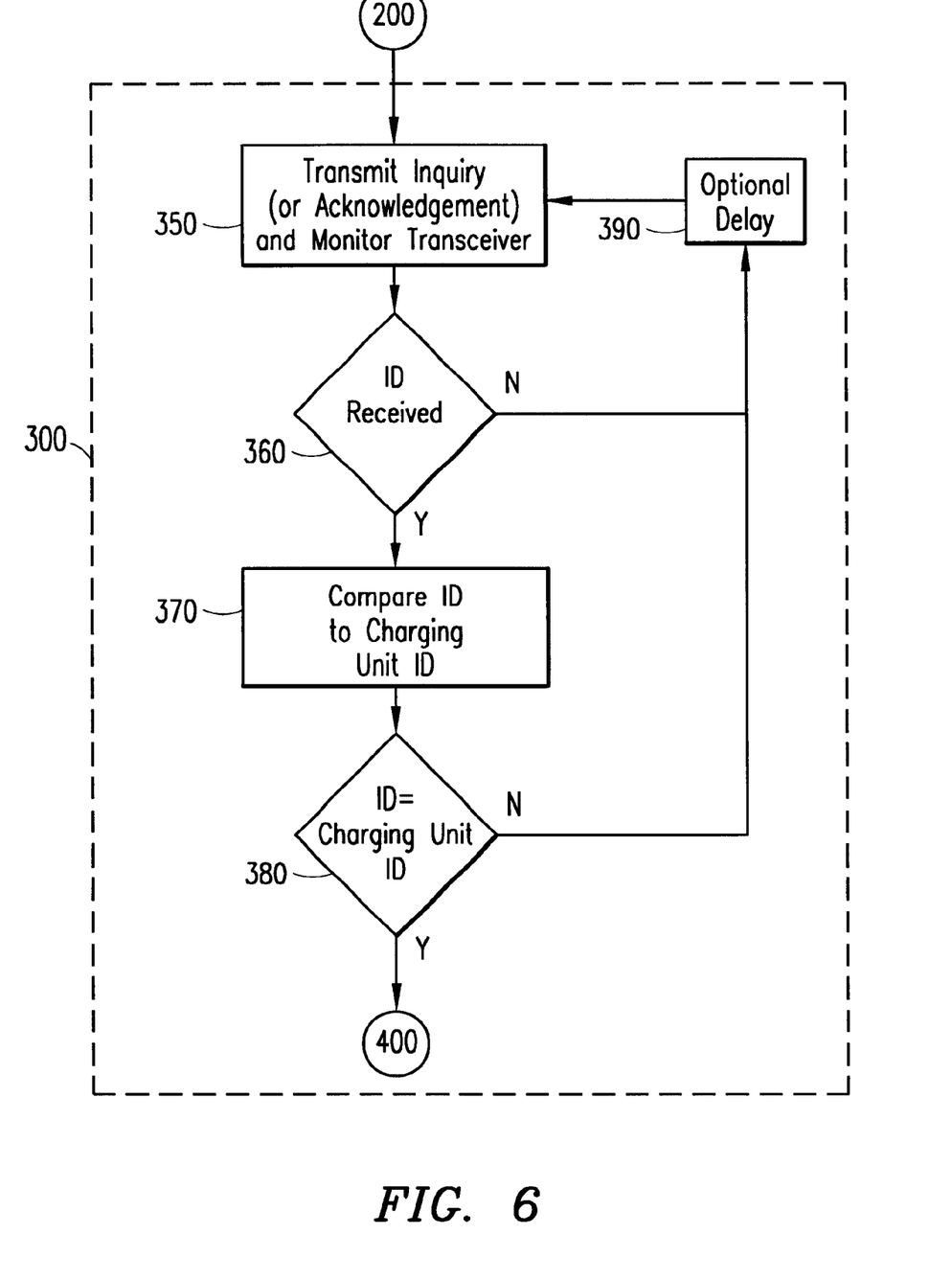
FIG. 6 illustrates an exemplary flow diagram of a method in accordance with the second embodiment of the present invention.

An exemplary flow diagram in accordance with the second embodiment of the present invention is illustrated in FIG. 6. In the second embodiment, the proximity of the mobile station 10 to the charging unit 30 is determined using a pair of short range transceivers (e.g., Bluetooth or Home RF). Accordingly, after step 200, the mobile station 10 transmits an inquiry signal to all devices within transmission range and monitors its associated transceiver 23 at step 350. Alternatively, the charging unit 30 periodically or continuously transmits a paging signal, and upon receiving a paging signal from a paging unit, the mobile station 10 transmits an acknowledgment signal, and monitors its associated transceiver 23 at step 350. In this alternative embodiment in which the charging unit 30 transmits a paging signal, the mobile station 10 may only "listen" for pages after a predetermined threshold of remaining battery capacity is met, or optionally the mobile station 10 my determine remaining battery capacity at each received page or after receiving a known identification. If no identification is received at step 360, the mobile station 10 transmits another inquiry signal (or another acknowledgment signal in response to another received page) and continues to monitor the transceiver 23 at step 350 again. An optional delay step 390 may be performed before passing control from step 360 back to step 350. If an identification is received, the identification is compared at step 370 to the identifications of known charging units stored in memory 18. At step 380, if the received identification matches an identification stored in memory 18, then control passes to step 400 where a recharge notification is initiated. Otherwise, control passes back to step 350, optionally through delay step 390.

It shall be emphasized that comprises/comprising when used in this Specification is taken to specify the presence of, for example, stated features, integers, steps, components, etc., but does not preclude the presence or addition of, for example, one or more other features, integers, steps, components, etc., or groups thereof. Additionally, it should be emphasized that the mobile station embodiment described herein is illustrative only, and not limiting. The principles of the present invention are equally efficable with portable battery-operated electronic devices in general. Furthermore, although preferred embodiment(s) of the method, system, and apparatus of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the spirit and scope of the present invention as set forth and defined by the following claims.

What is claimed is:

1. A portable battery-operated electronic device, comprising:
   a proximity detector, said proximity detector enabling determination of a proximity criterion for said electronic device and at least one corresponding charging unit;
   a controller coupled to said proximity detector, said controller initiating a user notification only when said controller determines that a remaining battery capacity of said electronic device satisfies a predetermined condition and that said proximity criterion is valid; and
   said criterion is valid when said electronic device is within a prespecified range of said at least one corresponding charging unit.

2. The portable battery-operated electronic device according to claim 1, wherein said predetermined condition comprises falling, below a 40 percent charge level.

3. The portable battery-operated electronic device according to claim 1, wherein said prespecified range is selected from a group comprising approximately 10 meters and approximately 100 meters of said at least one corresponding charging unit.

4. The portable battery-operated electronic device according to claim 1, wherein said controller determines that said proximity criterion is valid based, at least in part, on geographic positioning.

5. The portable battery-operated electronic device according to claim 4, wherein said proximity detector comprises a Global Positioning System (GPS) receiver.

6. The portable battery-operated electronic device according to claim 4, further comprising location data stored within said electronic device, said location data corresponding to a geographic location of said at least one corresponding charging unit.

7. The portable battery-operated electronic device according to claim 6, wherein said controller compares a present geographic location of said electronic device determined by said proximity detector with said location data to determine whether said proximity criterion is valid.

8. The portable battery-operated electronic device according to claim 6, wherein said location data is entered by user input of location coordinates.

9. The portable battery-operated electronic device according to claim 6, wherein said location data is entered automatically by said controller in response to a user input.

10. The portable battery-operated electronic device according to claim 5, wherein said GPS receiver comprises an external module that communicates with said controller via at least one of an electrical connector and an infrared (IR) link.

11. The portable battery-operated electronic device according to claim 4, wherein said geographic positioning is performed in accordance with a Global System for Mobile communications (GSM) location-determining algorithm.

12. The portable battery-operated electronic device according to claim 4, wherein said geographic positioning is performed in accordance with Global Navigation Satellite System (GLONASS) specifications.

13. The portable battery-operated electronic device according to claim 1, wherein said proximity detector comprises a short range radio interface device, and wherein said controller determines that said proximity criterion is valid by, at least in part, monitoring said short range radio interface device.

14. The portable battery-operated electronic device according to claim 13, wherein said short range radio interface device is configured to operate in accordance with Bluetooth specifications.

15. The portable battery-operated electronic device according to claim 14, further comprising identification data stored within said electronic device corresponding to a Bluetooth identity of said at least one corresponding charging unit.

16. The portable battery-operated electronic device according to claim 15, wherein said controller compares a received identification with said identification data to determine whether said proximity criterion is valid.

17. The portable battery-operated electronic device according to claim 16, wherein said received identification is in response to at least one of an acknowledgment signal and an inquiry signal transmitted by said electronic device.

18. The portable battery-operated electronic device according to claim 13, wherein said short range radio interface device operates in accordance with Home RF specifications.

19. A system for a rechargeable, battery-operated electronic device, comprising:
   a battery-operated electronic device;
   at least one charging unit associated with said battery-operated electronic device;
   a proximity detector, said proximity detector enabling determination of a proximity criterion for said battery-operated electronic device and said at least one charging unit; and
   a controller coupled to said proximity detector, said controller initiating a user notification only when said controller determines that a remaining battery capacity of said battery-operated electronic device satisfies a predetermined condition, and that said proximity criterion is valid based, at least in part, on monitoring a short-range radio interface device.

20. The system for a rechargeable, battery-operated electronic device according to claim 19, wherein said battery-operated electronic device includes identification data stored within said battery-operated electronic device corresponding to a Bluetooth identity of said at least one corresponding charging unit.

21. The system for a rechargeable, battery-operated electronic device according to claim 20, wherein said controller compares a received identification with said identification data to determine whether said proximity criterion is valid.

22. The system for a rechargeable, battery-operated electronic device according to claim 21, wherein said received identification is in response to at least one of an acknowledgment signal and an inquiry signal transmitted by said electronic device.

23. A method for notifying a user of a low battery condition of a battery-operated electronic device, comprising the steps of:

determining, in response to said low battery condition of said battery-operated electronic device, whether a proximity criterion for said battery-operated electronic device and at least one corresponding charging unit is valid; and generating a user notification only when said proximity criterion is valid, said proximity criterion being valid when said electronic device is within a prespecified range of said at least one corresponding charging unit.

24. The method for notifying a user of a low battery condition of a battery-operated electronic device according to claim 23, wherein said low battery condition comprises a remaining battery capacity associated with said battery-operated electronic device falling below a 40 percent charge level.

25. The method for notifying a user of a low battery condition of a battery-operated electronic device according to claim 23, wherein said prespecified range is selected from a group comprising approximately 10 meters and approximately 100 meters.

26. The method for notifying a user of a low battery condition of a battery-operated electronic device according to claim 23, wherein the step of determining comprises determining a geographic position.

27. The method for notifying a user of a low battery condition of a battery-operated electronic device according to claim 23, wherein the step of determining comprises the steps of:

determining a present geographic position of said battery-operated electronic device;

comparing said present geographic position of said battery-operated electronic device to a stored geographic location of said at least one corresponding charging unit; and determining that said proximity criterion is valid if said present geographic position is within a predetermined distance from said stored geographic location.

28. The method for notifying a user of a low battery condition of a battery-operated electronic device according to claim 27, wherein the step of determining said present geographic position is performed using a Global Positioning System (GPS) receiver.

29. The method for notifying a user of a low battery condition of a battery-operated electronic device according to claim 27, wherein the step of determining said present geographic position is performed in accordance with at least one of Global System for Mobile communications (GSM) specifications and Global Navigation Satellite System (GLONASS) specifications.

30. The method for notifying a user of a low battery condition of a battery-operated electronic device according to claim 23, wherein the step of determining comprises monitoring a short range radio interface associated with said battery-operated electronic device.

31. The method for notifying a user of a low battery condition of a battery-operated electronic device according to claim 23, wherein the step of determining comprises the steps of:

transmitting a signal;

detecting at least one identification received by a short range radio interface in response to said signal;

comparing said at least one identification to a stored list including at least one identity corresponding to said at least one corresponding charging unit; and determining that said proximity criterion is valid if said at least one identification is within said stored list that includes said at least one identity.

32. The method for notifying a user of a low battery condition of a battery-operated electronic device according to claim 31, wherein said signal comprises an acknowledgment signal transmitted by said battery-operated electronic device in response to a page signal transmitted by said at least one corresponding charging unit.

33. The method for notifying a user of a low battery condition of a battery-operated electronic device according to claim 31, wherein said signal comprises an inquiry signal transmitted by said battery-operated electronic device to devices within transmission range.

34. The method for notifying a user of a low battery condition of a battery-operated electronic device according to claim 31, wherein said short range radio interface operates in accordance with at least one of Bluetooth specifications and Home RF specifications.

* * * * *

UNITED STATES PATENT AND TRADEMARK OFFICE
CERTIFICATE OF CORRECTION

PATENT NO. : 6,323,775 B1  Page 1 of 1
DATED : November 27, 2001
INVENTOR(S) : Hans Magnus Hansson It is certified that error appears in the above-identified patent and that said Letters Patent is hereby corrected as shown below:

Title page,
Item [73], replace "Telefonaktiebolaget IM Ericsson (publ)" with
-- "Telefonaktiebolaget LM Ericsson (publ )" --

Column 3,
Line 67, replace "(PDAS)" with -- (PDAs) --

Column 9,
Line 42, replace "falling, below" with -- falling below --

Signed and Sealed this

Twenty-eighth Day of January, 2003

JAMES E. ROGAN
*Director of the United States Patent and Trademark Office*